(12) United States Patent
Bankman et al.

(10) Patent No.: US 8,289,127 B2
(45) Date of Patent: Oct. 16, 2012

(54) SWITCHING SYSTEMS

(75) Inventors: Jesse R. Bankman, Gibsonville, NC (US); Kimo Y. F. Tam, Lincoln, MA (US)

(73) Assignee: Analog Devices, Inc., Norwood, MA (US)

( * ) Notice: Subject to any disclaimer, the term of this patent is extended or adjusted under 35 U.S.C. 154(b) by 1633 days.

(21) Appl. No.: 11/711,250

(22) Filed: Feb. 27, 2007

(65) Prior Publication Data

US 2008/0204189 A1 Aug. 28, 2008

(51) Int. Cl.
*H03K 17/00* (2006.01)
(52) U.S. Cl. .................................................. 340/2.28
(58) Field of Classification Search .................. 340/2.28, 340/2.21, 14.1, 14.2, 2.27, 14.4, 14.6
See application file for complete search history.

(56) References Cited

U.S. PATENT DOCUMENTS 5,754,791 A * 5/1998 Dahlgren et al. ............. 709/242
6,501,327 B1 * 12/2002 Tam ............................. 327/538

OTHER PUBLICATIONS

Katz, Randy H., *Contemporary Logic Design*, Register File, The Benjamin/Cummings Publishing Company, Inc. 1994, pp. 330-331.
Rabaey, Jan M., *Digital Integrated Circuits, A Design Perspective*, Chapter 10, Designing Memory and Array Structures, Prentice Hall Inc., 1996, Upper Saddle River, NJ 07458, pp. 551-622,628.
Meyer et al. "Predicting the Yield Efficacy of a Defect-Tolerant Embedded Core," IEEE International Symposium on Defect and Fault Tolerance in VLSI Systems Oct. 25, 2000-Oct. 27, 2000, 2000, pp. 30-38.
Kabacinski et al. "Guest Editorial: 50th Anniversary of Clos Networks". [online] Communications Magazine, IEEE, vol. 41, No. 10, Oct. 2003, pp. 26-27.

* cited by examiner

*Primary Examiner* — Vernal Brown
(74) *Attorney, Agent, or Firm* — Knobbe Martens Olson & Bear LLP (57) ABSTRACT

Distributively associated with each output row of point cells or each subset of point cells in each output row is one or more of a: memory device for storing an address identifying a cell in its associated output row and a decoder device responsive to the memory device for actuating the associated enable circuit to operate the transconductance device of the identified cell; a bias device, and an output cascode device; and also disclosed as switching systems having a bias device including a current mirror with an input reference portion responsive to a reference current and a co-located output local portion for reproducing that current as the bias current.

52 Claims, 6 Drawing Sheets

FIG. 6

SWITCHING SYSTEMS

FIELD OF THE INVENTION

This invention relates to improvements in cross point switching systems and also to a distributed bias device with co-located current mirror portions for use in switching systems generally as well as to cross point switching systems.

BACKGROUND OF THE INVENTION

Conventional switching systems, e.g. cross point switching systems are under constant pressure to increase the number of switched inputs and outputs and their switching speed. Non-blocking cross-point switching systems, those in which any number of outputs can be connected to an input and as many as all outputs can be activated at one time are under particular pressure to improve because of the growing video/communications market. Typically the array of switching point cells is arranged in m input rows and n output rows which intersect to uniquely identify each switching cell. When a number of outputs are connected to one input, that input experiences an increasing load which slows down the response. To overcome this switch point cells are made with a buffered connection. One problem with large arrays of switching cells is that the more inputs m and outputs n there are, the larger must be the associated conductors. These conductors have associated with them resistance $R_c$ and capacitance $C_c$ which increase with the length of the conductors. The larger the $R_c$ and $C_c$, the greater the time constant, $\tau$, and this leads to slower response time and lower signal path bandwidth. Another source of capacitance that contributes to high $\tau$ and low bandwidth is the capacitance $C_x$ of the switching point cells. One approach to reduce $\tau$ and increase speed and bandwidth uses a distributed bit memory, a one bit memory associated with each point cell so that instead of requiring m×n conductors to address each cell, only m+n conductors are required. The closer the point cells are together and the smaller they are, the smaller will be the area of the switching system and the shorter will be the conductors. Also, an overall smaller area produces an increased chip yield as well, since yield is inversely proportional to the area of the chip. Reducing the number of devices in each cell not only reduces their size and chip area, it also reduces the cell capacitance $C_x$.

BRIEF SUMMARY OF THE INVENTION

It is therefore an object of this invention to provide an improved cross point switching system It is a further object of this invention to provide such an improved cross point switching system which has reduced area, reduced conductor numbers and length, and reduced numbers of devices per point cell.

It is a further object of this invention to provide such an improved cross point switching system which has a lower time constant, higher speed and bandwidth and higher yield.

It is a further object of this invention to provide such an improved cross point switching system which reduces the total number of current source (bias) devices in a point cell and/or reduces average area required for biasing a point cell.

It is a further object of this invention to provide such an improved cross point switching system which reduces the number of current source (bias) devices that must match allowing smaller devices to be used and saving point cell area.

It is a further object of this invention to provide such an improved cross point switching system which shares and distributes the decoding structure for a plurality of point cells reducing the number of data line conductors passing through the array of point cells.

It is a further object of this invention to provide such an improved cross point switching system which shares output cascode devices among a plurality of point cells reducing the average size of the point cells and reducing the total load at the output of the point cell which allows the point cell and its receiver to operate at lower power which can further lower the area of the point cell.

It is a further object of this invention to provide such an improved cross point switching system which uses distributed, co-located bias devices ensuring low impedance bias voltage even in the presence of a large capacitive load and significant conductor resistance ensuring matching operating characteristics.

It is also an object of this invention to provide a distributed bias device with co-located current mirror portions which is beneficial in switching systems generally as well as cross point switching systems.

The invention results from the realization that an improved smaller, faster, higher bandwidth and higher yield cross point switching system can be achieved by distributively associating with each output row of point cells or each subset of point cells in each output row one or more of a: memory device for storing an address identifying a cell in its associated output row and a decoder device responsive to the memory device for actuating the associated enable circuit to operate the transconductance device of the identified cell; a bias device, an output cascode device; and from the further realization that cross point switching systems and switching systems in general can be benefited by a bias device including a current mirror having an input reference portion responsive to a reference current and a co-located output local portion for reproducing that current as the bias current.

The subject invention, however, in other embodiments, need not achieve all these objectives and the claims hereof should not be limited to structures or methods capable of achieving these objectives.

This invention features a cross point switching system including an array of switching point cells arranged in input rows and output rows. Each switching point cell includes a transconductance device, an output cascode device and an enable circuit associated with each of the cells. Each output row has associated with it at least one memory device for storing an address identifying a cell in its associated output row. A decoder device responsive to the memory device actuates the associated enable circuit to operate the transconductance device associated with the identified cell.

In a preferred embodiment the memory device may include a write enable input for latching an address. The decoder device may disable each of the unaddressed associated cells. The decoder device may disable each of the enable circuits of the unaddressed cells. The decoder device may include a disable circuit associated with each cell and the decoder device may actuate the disable circuit associated with each of the unaddressed associated cells. There may be a plurality of memory devices each associated with a subset of cells in the associated output row and each for storing an address identifying a cell in its associated subset of cells. There may be a biasing device for connection to the transconductance device by the enable circuit. The biasing device may include a bias circuit associated with each output row. The biasing device may include a bias circuit associated with each output cell. The enable circuit may include a cascode switch. The enable circuit may include a bias cascode circuit coupled between the bias device and the transconductance device, and a gate switch for enabling the bias cascode circuit to deliver the output current of the bias device to the transconductance device. The gate switch may disable the bias cascode circuit associated with each of the unidentified cells and the enable circuit may actuate the output cascode device.

This invention also features a cross point switching system including an array of switching point cells arranged in input rows and output rows. Each point cell includes a transconductance device, an output cascode device and an enable circuit associated with each of the cells. Each output row has associated with it at least one bias device. A memory device identifies a cell in an output row and actuates the enable circuit associated with the identified cell to deliver the output current of the bias device to the transconductance device of the identified cell.

In a preferred embodiment the enable circuit may actuate the output cascode device. The memory device may store an address identifying a cell in its associated output row. The decoder device may be responsive to the memory device for actuating the associated enable circuit to operate the transconductance device of the identified cell. The memory device may include a write enable input for latching an address. The decoder device may disable each of the unaddressed associated cells. There may be a plurality of memory devices each associated with a subset of cells in the associated output row and each for storing an address identifying a cell in its associated subset of cells. The enable circuit may include a cascode switch for delivering the output current of the bias device to the transconductance device. The enable circuit may include a bias cascode circuit coupled between the bias device and the transconductance device and a gate switch for enabling the bias cascode circuit to deliver the output current of the bias device to the transconductance device. The gate switch may disable the bias cascode circuit associated with each of the unidentified cells.

This invention also features a cross point switching system including an array of switching point cells arranged in input rows and output rows. Each point cell includes a transconductance device, and an enable circuit associated with each of the cells, an output bus, a bias device. A memory device identifies a cell in an output row and actuates the enable circuit associated with the identified cell to deliver the output current of the bias device to the transconductance device of the identified cell. Each output row has associated with it as least one output cascode device for interconnecting the transconductance device of the identified cell to the output bus.

In a preferred embodiment the enable circuit may actuate the output cascode device. The memory device may store an address identifying a cell in its associated output row. The decoder device may be responsive to the memory device for actuating the associated enable circuit to operate the transconductance device of the identified cell. The memory device may include a write enable input for latching an address. The decoder device may disable each of the unaddressed associated cells. There may be a plurality of memory devices each associated with a subset of cells in the associated output row and each for storing an address identifying a cell in its associated subset of cells. The enable circuit may include a cascode switch for delivering the output current of the bias device to the transconductance device. The enable circuit may include a bias cascode circuit coupled between the bias device and the transconductance device and a gate switch for enabling the bias cascode circuit to deliver the output current of the bias device to the transconductance device. The gate switch may disable the bias cascode circuit associated with each of the unidentified cells.

This invention also features a cross point switching system including an array of switching point cells arranged in input rows and output rows. Each point cell includes a transconductance device, and an enable circuit associated with each of the cells. At least one bias device is associated with each output row for providing a bias current to associated cells in that row. A memory device identifies a cell in an output row and actuates the enable circuit associated with the identified cell to deliver the output current of the bias device to the transconductance device of the identified cell. A switching circuit enables a selected one of the at least one bias device associated with the identified cell. The bias device includes a current mirror having an input reference portion responsive to a reference current and a co-located output local portion for reproducing that current as the output current of the bias device.

In a preferred embodiment the enable circuit may actuate the output cascode device. The memory device may store an address identifying a cell in its associated output row. The decoder device may be responsive to the memory device for actuating the associated enable circuit to operate the transconductance device of the identified cell. The memory device may include a write enable input for latching an address. The decoder device may disable each of the unaddressed associated cells. There may be a plurality of memory devices each associated with a subset of cells in the associated output row and each for storing an address identifying a cell in its associated subset of cells. The enable circuit may include a cascode switch for delivering the output current of the bias device to the transconductance device. The enable circuit may include a bias cascode circuit coupled between the bias device and the transconductance device and a gate switch for enabling the bias cascode circuit to deliver the output current of the bias device to the transconductance device. The gate switch may disable the bias cascode circuit associated with each of the unidentified cells. There may be a plurality of current mirrors each associated with a subset of cells in the associated output row and each co-located with its associated subset. The bias device may include a reference current source.

This invention also features a cross point switching system including an array of switching point cells arranged in input rows and output rows, an output bus, each point cell including a transconductance device and an enable circuit associated with each cell. Each output row has associated with it at least one bias device, at least one output cascode device, at least one memory device for storing an address identifying a cell in its associated output row and a decoder device responsive to the memory device for actuating the associated enable circuit to operate the transconductance device associated with the identified cell to interconnect the output cascode device associated with the identified cell to the output bus and to deliver the output current of the bias device to the transconductance device.

In a preferred embodiment there may be a bias device, and an output cascode device associated with each subset of cells in the associated output row. The bias device may include a current mirror having a reference portion responsive to a reference current and a co-located local output portion for reproducing that current as the bias device output current. There may be a plurality of current mirrors each associated with a subset of cells in the associated output row and each co-located with its associated subset.

This invention also features a switching network including, a plurality of biasable circuits, a selection circuit for selecting one of the biasable circuits, and a bias device for providing a bias current to the selected biasable circuits. The bias device includes a current mirror having an input reference portion responsive to a reference current and a co-located output local portion for reproducing that current as the bias current.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
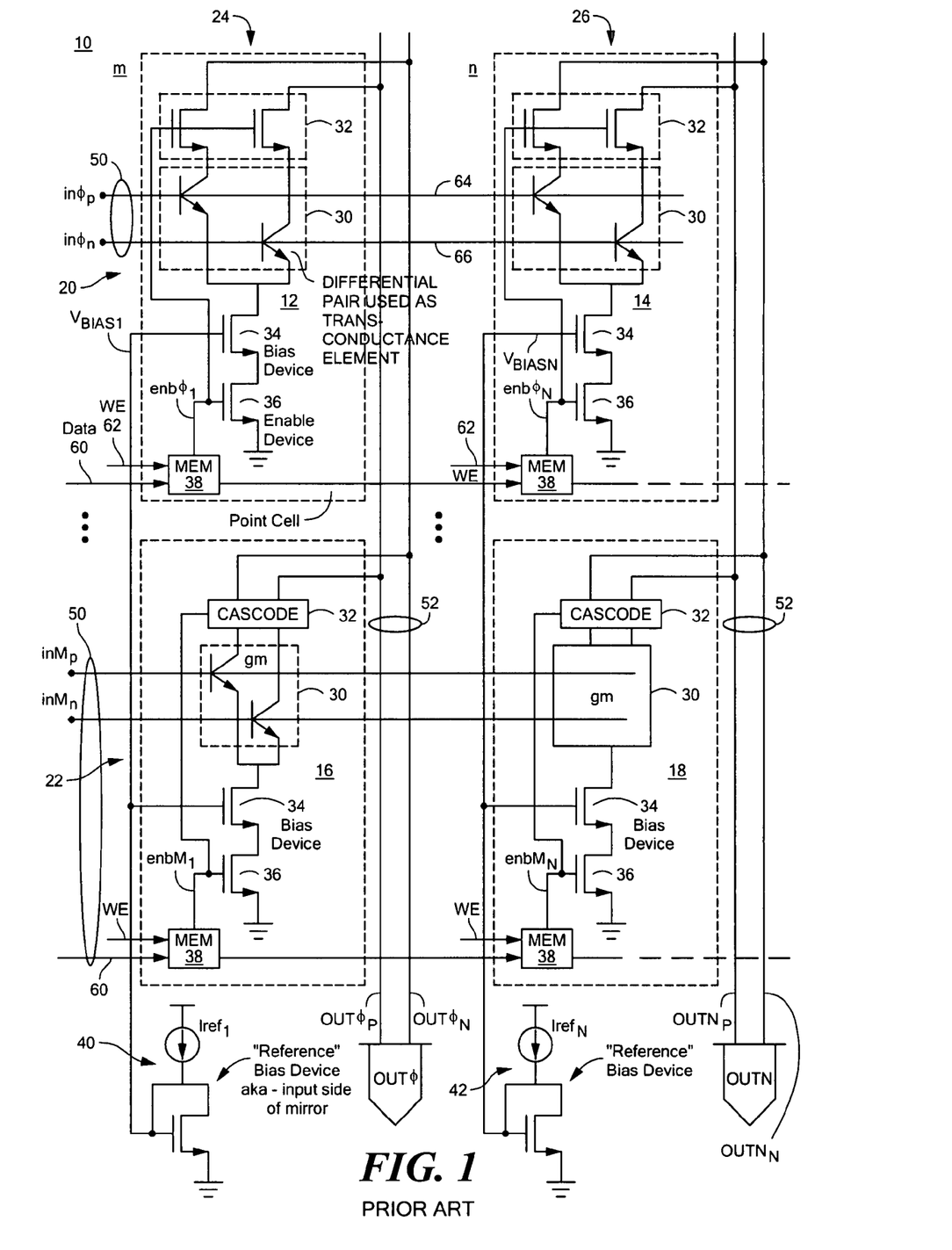
FIG. 1 is a schematic diagram of a portion of a prior art cross point switching array.

There is shown in FIG. 1 a prior art cross point switching system 10 including an array of cells 12, 14, 16 and 18 arranged in m input rows and n output rows which intersect uniquely to find the position of each cell. For example, input row 20 includes cells 12 and 14 while input row 22 includes cells 16 and 18. Output row 24 includes cells 12 and 16 while output row 26 includes cells 14 and 18. Although typically these arrays will have hundreds or even thousands of cells, only four are shown here for simplicity. Each cell as shown with respect to cell 12 includes a transconductance device 30 using a differential pair as the transconductance element, an output cascode device 32, a bias device 34, an enable device or circuit 36 and a memory device 38. Each of the bias devices 34 in each cell is one-half of a current mirror the other half of the current mirror 40 is remotely located. There can be one associated with each output row known as a reference portion, for example, where the reference portion of the current mirror 40 is associated with output row 24 and the reference portion 42 is associated with output row 26.

In operation, an address is loaded in memory 38 which identifies one of the cells to be actuated to make the connection from the input bus 50 to the output bus 52. Assuming that the address identifies cell 12, memory 38 which is typically a one bit memory actuates enable circuit 36 in cell 12. This operates the bias device 34 in cell 12 to provide current to the transconductance device 30 in cell 12 which will provide an output to cascode device 32 of cell 12 to the output bus 52. Enable circuit 36 enables bias device 34 to provide current to the transconductance device 30 which is modulated by the input signal on input buses 50 and delivered through cascode output device 32 to output bus 52. Each of the other cells 14, 16, and 18 are disabled by the lack of output from their associated memories 38 and so those unidentified cells remain off and no cross connection is made between the input and the output.

In this prior art cross point switching array each cell includes a transconductance device, an output cascode device, a bias device, an enable circuit, and a memory device. In addition to requiring a large area to accommodate all of these different devices and circuits this construction also requires a large number of conductors, input and output, which increase the area required and thereby also increase the length of the conductors which increases the capacitance and the resistance that they introduce. In addition because the biasing devices are spread over such a large distance, that is, the local current mirror portions 34 are remote from the current mirror reference portions 40, 42 . . . , respectively, the local current mirror portions 34 must be made large in order to establish a degree of insensitivity to manufacturing and operational gradients thereby ensuring accurate reproduction of the mirrored current. A further problem is that each of the local current mirror portions 34 has to match the reference current mirror portion 40 of its particular output row or if there is one current mirror reference portion for all output rows then to match that one. Since there are so many current mirror local portions, hundreds or thousands in a typical cross point array, the probability that any one of them, would be within, for example, an accuracy of 1% would be low. In order to increase that probability each of the current mirror local portions must be made even larger to ensure that the necessary accuracy is obtained with high probability. That is, the worst case matching between any one of the current mirror local portions and the remote reference portion is within the required accuracy.

When it is desired to operate cell 14 there would be a signal placed on data line 60 to memories 38 in cells 12 and 14. There would be no signal on line 60 to memories 38 of cells 16 and 18 in input row 22. Then a write enable would be provided for all the memories 38 in output row 26. This would cause memory 38 to operate enable circuit 36 in cell 14 and turn on cell 14 so that the input on lines 64 and 66 modulates the current from bias device 34 and provides it through cascode output device 32 to output bus 52. The write enable thus stores a one in memory 38 of cell 14 but a zero in memory 38 of cell 18. When the write enable ends the one is latched in memory 38 and point cell 14 is latched in the on position.

In accordance with this invention one or more components of the cells may be shared. For example in FIG. 2, instead of using a one bit memory associated with each cell, at least one multi-bit memory is associated with each output row or subset of cells in an output row. Array 100, FIG. 2, includes a number of cells arranged in m input rows and n output rows only six of which cells 102, 104, 106, 108, 110, 112 are shown for simplicity. There are three input rows 114, 116, 118 (m=3) and two output rows 120, and 122 (n=2). Each output row has associated with it a multi-bit memory 130 and a decoder 132. Each cell also includes enable circuit 124, a transconductance device 126, cascode output device 128 and a separate disable circuit 136. The disable circuit may include an inverter 138, and cascode disable device 140. Also included in this particular embodiment is a bias device 142 in each cell.

Figure 2:
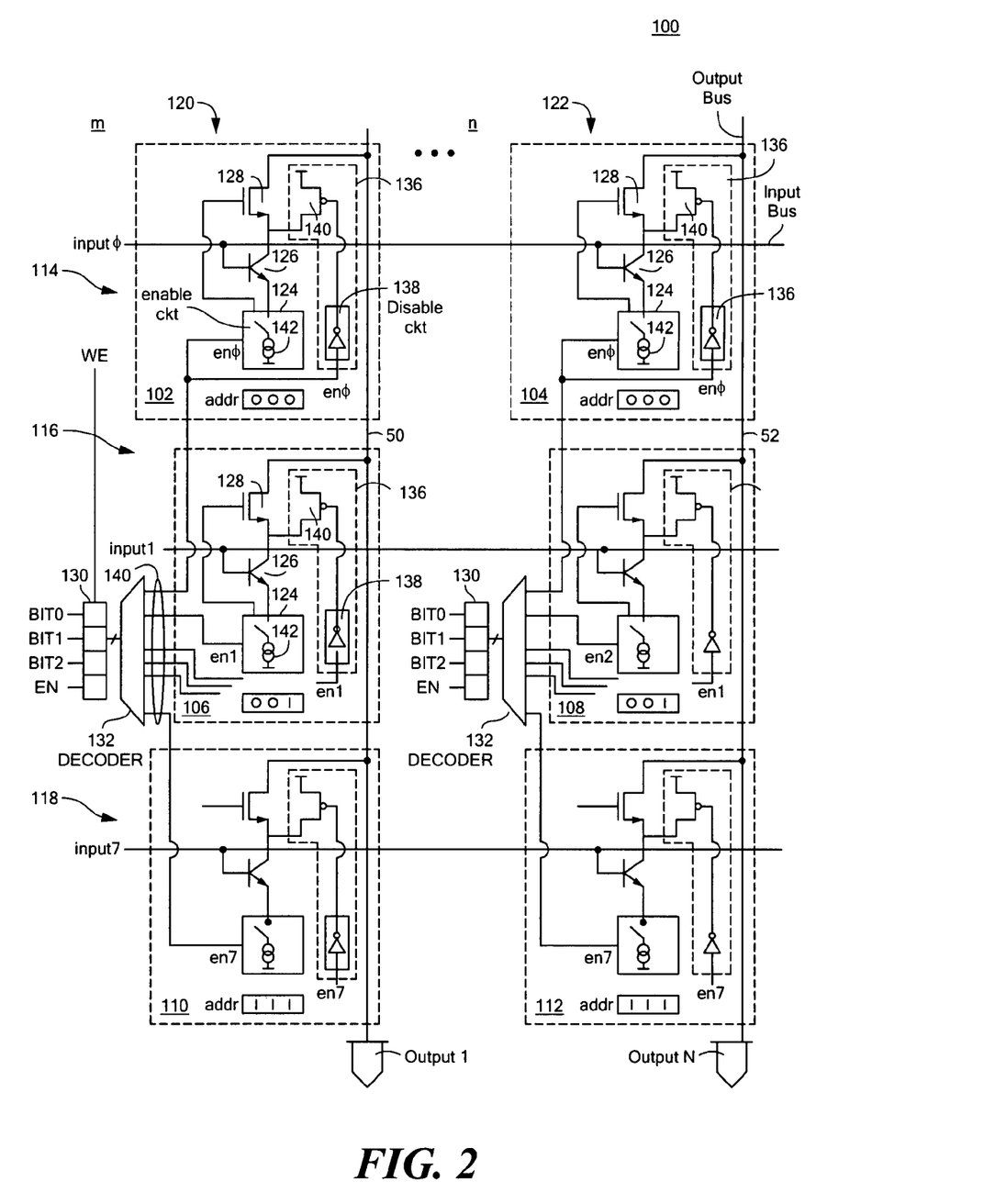
FIG. 2 is schematic diagram of a portion of a shared, multi-bit memory embodiment of a cross point switching array according to this invention.

In operation an address in multi-bit memory 130 is decoded by decoder 132. Assuming that the address is that of cell 102, decoder 132 in cell 102 actuates enable circuit 124 in cell 102 to close and connect current bias device 142 in cell 102 to the transconductance device 126 in cell 102. In the remaining cells serviced by multi-bit memory device 130 and decoder 132, decoder 132, (whether it be the entire output row 120 or some subset of cells in that output row,) will provide zeros leaving the associated enable circuits 126 open so that their associated bias devices 142 are not connected to their associated transconductance devices 126. Thus instead of requiring m+n addressing lines (160, FIG. 1) this invention requires only 2 m/k+n address lines, where k is the number of cells associated with multi-bit memory device 130 and decoder 13. In the prior art there was an input row associated with each one bit memory associated with each of the m×n cells. In accordance with this invention the m×n addresses can be addressed by just a few lines to multi-bit memory 130 and then broadcast individually by decoder 132 using local, relatively short, lines within each row or subset of cells in a row, thereby saving memory cell area and associated conductor area and length, and the space required to accommodate them on the chip.

Figure 3:
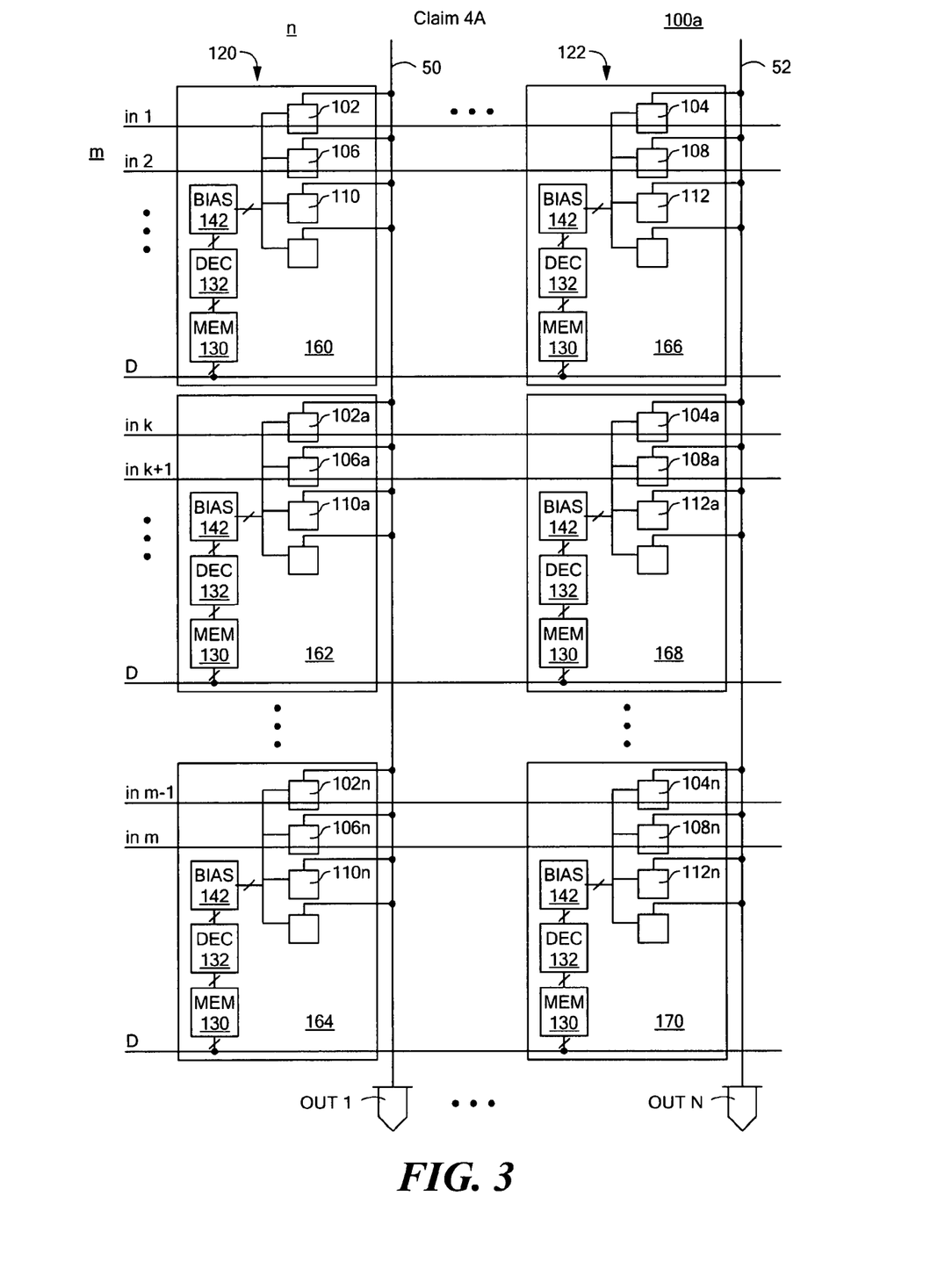
FIG. 3 is a view similar to FIG. 2 with the cells of the output rows grouped in subsets.

Although thus far the example in FIG. 2 has been shown as having one multi-bit memory 130 associated with all of the cells in an output row this is not a necessary limitation of the invention. The output row could contain a large number of cross point cells, for example, 256 or 512 and they may be broken down into subsets of 8, 16 or 32 or whatever number is convenient. This is depicted in FIG. 3, where output row 120 is broken into three subsets 160, 162, 164 each having a plurality of cells 102, 106, 110 and its own associated bias device 142, decoder circuit 132, and memory 130. Also included in each cell, 102, 106, 110 are the previously mentioned output cascode device, transconductance device, and enable circuit.

Figure 4:
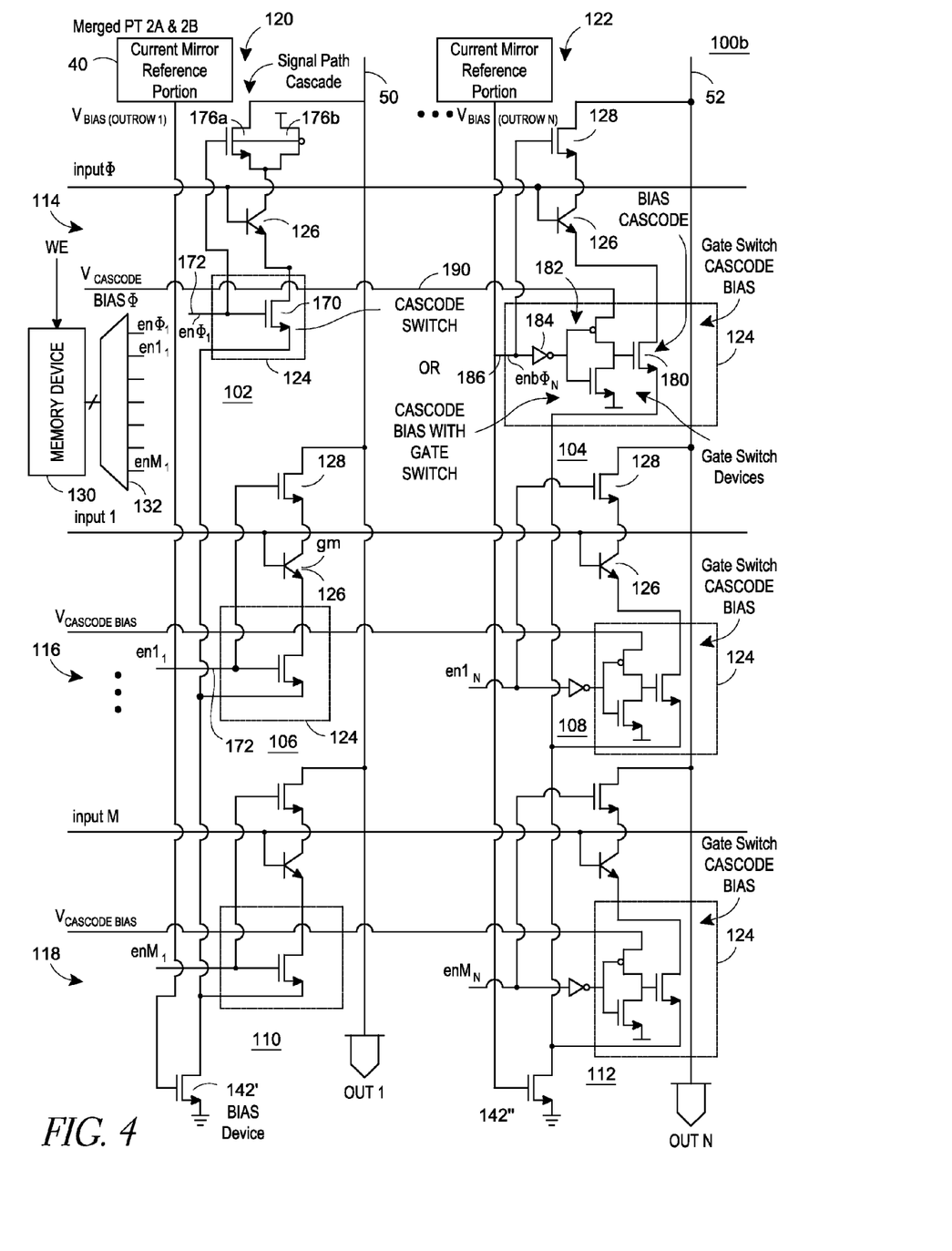
FIG. 4 is a view similar to FIG. 2 employing shared bias devices and alternative enable circuit embodiments.

Thus far the bias device has been a current mirror local portion associated with each cell and a current mirror reference portion associated with each output row or subset thereof, there could even be but one current mirror reference portion associated with the entire array for all rows, with the disadvantages as explained above. One way to avoid some of the problems associated with the individual bias devices for each cell is to use a current mirror reference circuit which drives a single bias device that has associated it with either all the cells in an output row of cells or a subset of cells in an output row of cells. In that case, the current mirror reference portion would cooperate with one or more current mirror local portions associated with each output row or subset. In FIG. 4, the current mirror reference 40 cooperates with one bias device 142' which services all of the cells in an output row or subset of the output row, for example, cells 102, 106 and 110 as a subset of all of the cells in row 120. The output current from bias device 142' is delivered to transconductance device 126 by a cascode switch 170 in enable circuit 124, as explained with reference to cell 102 but applicable to all cells. Thus, when an enable signal appears on line 172, cascode switch 170 in cell 102 delivers the current from bias device 142' to its associated transconductance device 126 which then is modulated by the signal input and delivered through cascode output 128 in cell 102 to output bus 50. All of the cells 102, 106, 110 . . . in output row 120, as shown, and serviced by bias device 142'. Also with respect to cell 102 transconductance device 126 may be a differential circuit using a differential pair, and cascode output device 128 may be implemented as a T-switch for improved crosstalk performance with cascode device 176a active when the cascode is passing signal and clamp device 176b shunting aggressor signal to the supply when cascode output device 128 is disabled Alternatively, as shown in cell 104 in output row 122 and also shown in cells 108 and 112 of that row, enable circuit 124 may include a bias cascode circuit 180 operated by a gate switch device 182 driven by inverter 184 in response to an input enable signal on line 186. While in the enable circuit 124 of cell 102 the cascode switch 170 operates simply as a switch and the capacitance and impedance associated with bias device 142' is reflected at the transconductance device 126, this is not the case with respect to the embodiment of enable circuit 124 in cell 104. There the bias cascode circuit 180 acts as a cascode device for the output of bias device 142" thereby increasing the output impedance seen by transconductance device 126 and isolating the capacitance of the associated bias device 142". Gate switch 182 shorts the gate of bias cascode circuit 180 to the local cascode voltage rail 190 or to disable it shorts it to ground, effectively keeping all the current in the actuated cell and keeping the other cells for example 108 and 112, off.

Figure 5:
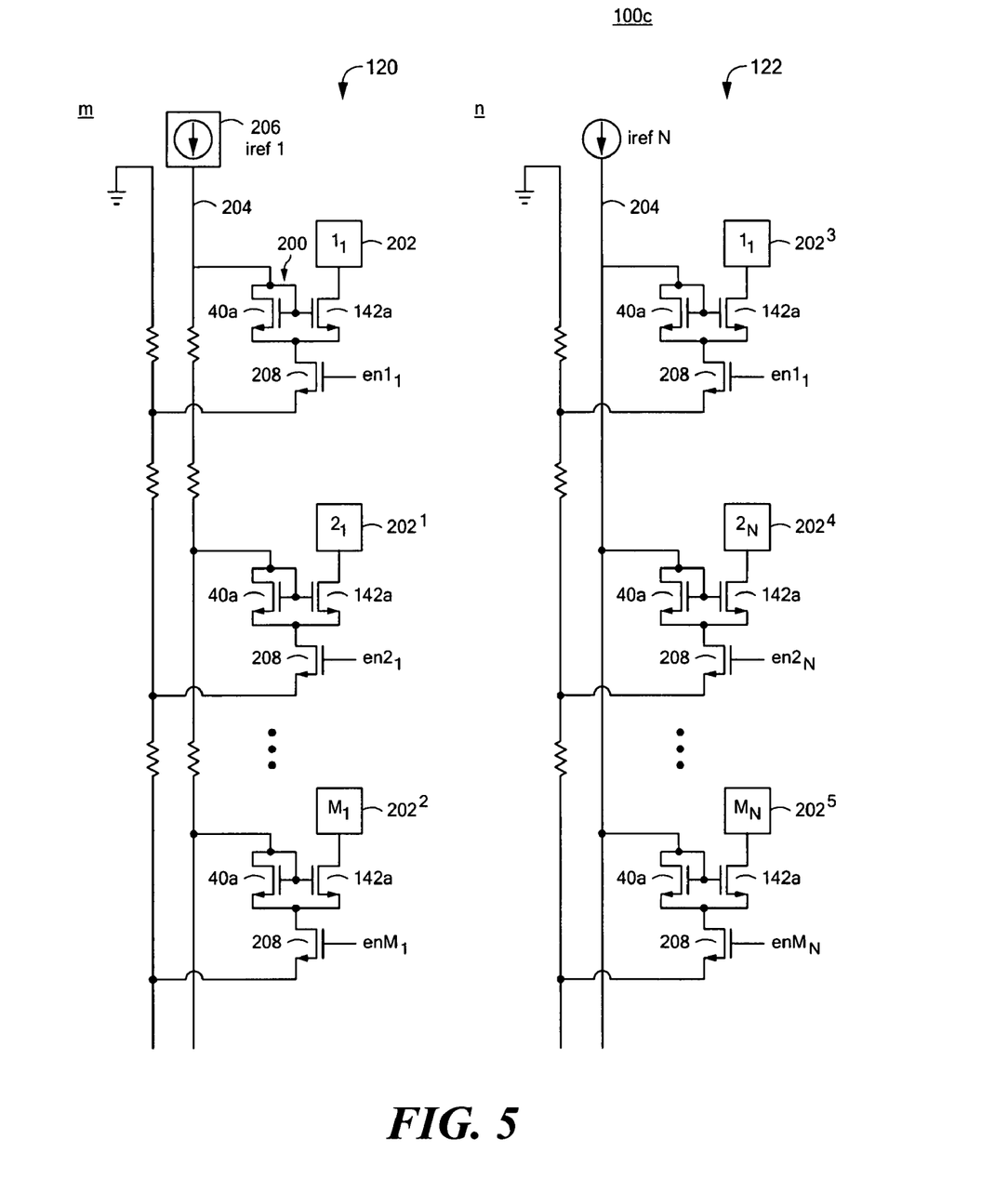
FIG. 5 is a view similar to FIG. 2 with a shared bias device employing co-located current mirror portions.

Further improvements in performance can be achieved in accordance with this invention by co-locating the current mirror reference portion 40a, FIG. 5, and the current mirror local portion 142a close together as shown by the current mirror 200 associated with one or more (an output row or a subset of an output row) point cells 202. The co-location of the current mirror reference portion and the current mirror local portion as at 200 can be done for each row of output cells or each subset of cells in a row of output cells. It could also be done for each cell but there would no longer be a substantial advantage in that case.

In operation a reference current on line 204 is provided by a current reference source 206. That reference current received by the current mirror reference portion 40a associated with cells 202 is reflected through current mirror local portion 142a to the associated cell or cells 202, when and only when mirror switch 208 is actuated by a signal from the associated enable circuit. Because the current mirror reference portion and the current mirror local portion are in close proximity the probability for a better match between the two is much improved and sensitivity to gradients substantially decreased. In addition, instead of having to match one current mirror reference portion with a multiplicity of current mirror local portions there is now required only to match each local current mirror reference portion with its own co-located current mirror local portion which has a much higher probability of success.

Figure 6:
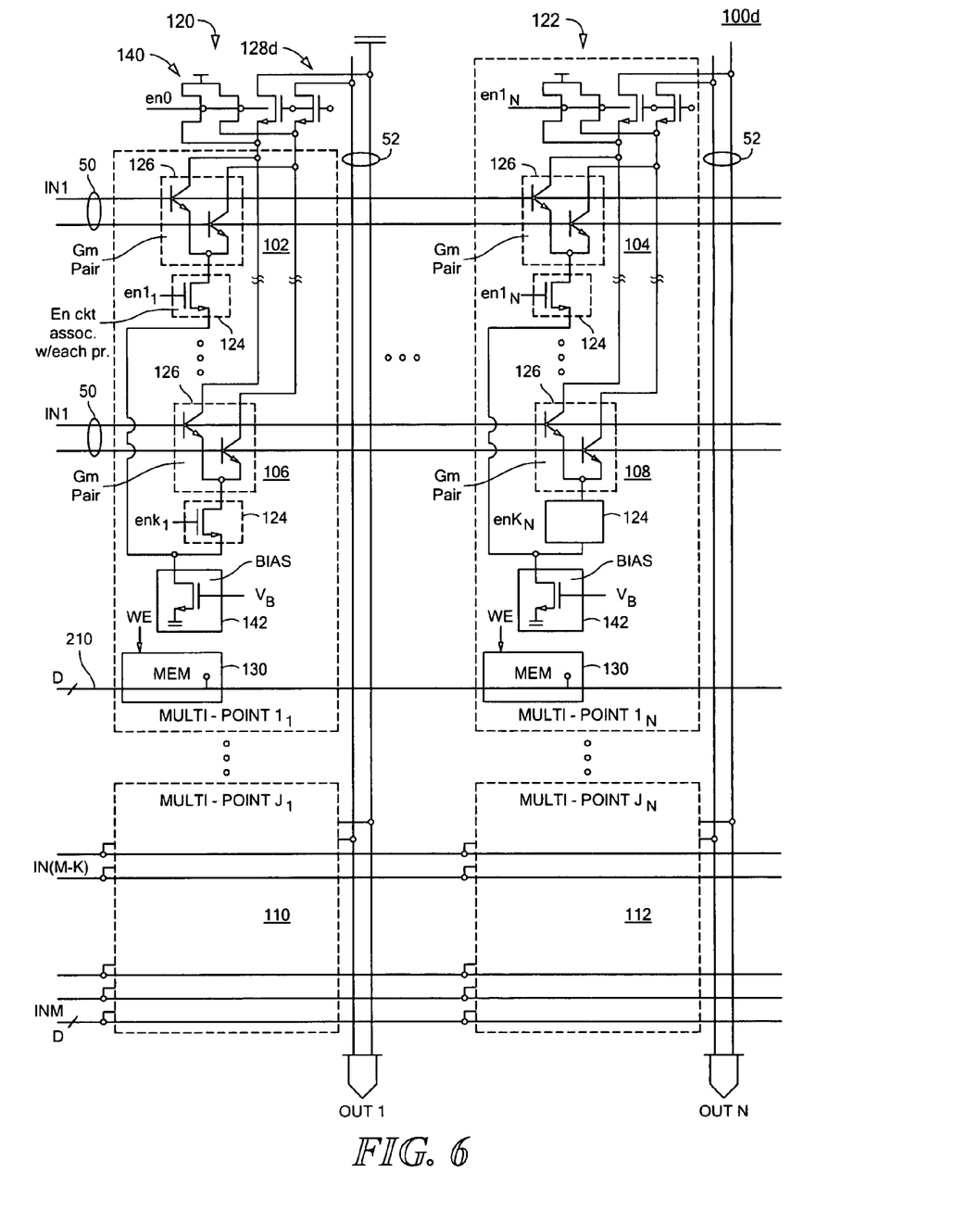
FIG. 6 is a view similar to FIG. 2 employing shared output cascode devices as well as shared bias devices.

To further the objects of this invention the output cascode device 128 may also be shared among a group of cells, either a subset of cells in an output row of cells or an entire output row of cells. For example, as shown in FIG. 6, output cascode device 128d is shared by cells 102, 106, etc. . . . . . In operation an address appearing on data line 210 to multi-bit memory 130 either directly or through a decoder provides a number of enable signals $en_0$-$en_k$. Assuming that the address identifies one of the associated cells 102, 106 the signal $en_0$ disables cascode disable circuit 140 and enables output cascode device 128d connecting it to the output bus 52. At the same time one of the other enable signals $en_1$-$en_k$ will operate the enable circuit 124 associated with the one of cells 102, 106 etc. which has been identified by the address in memory 130. By sharing the output cascode device 128d with a number of point cells the loading on output bus 52 is substantially decreased.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A cross point switching system comprising:
an array of switching point cells arranged in input rows and output rows;
each switching point cell including a transconductance device, an output cascode device, and an enable circuit; and
each said output row having associated with it:
at least one distinct memory device for storing one or more addresses identifying one or more switching point cells in the associated output row, and
a distinct decoder device responsive to said memory device for actuating the enable circuit of an identified switching point cell to operate the transconductance device of the identified switching point cell.

2. The cross point switching system of claim 1, wherein said memory device includes a write enable input for latching said address.

3. The cross point switching system of claim 1, wherein said distinct decoder device disables the unaddressed switching point cells of the associated output row.

4. The cross point switching system of claim 3, wherein said decoder device disables each of the enable circuits of the unaddressed switching point cells of the associated output row.

5. The cross point switching system of claim 3, further comprising a disable circuit associated with each said switching point cell, wherein and said distinct decoder device actuates the disable circuit associated with each of the unaddressed switching point cells.

6. The cross point switching system of claim 1, wherein the at least one distinct memory device comprises a plurality of memory devices arranged in different locations proximate to the associated output row, wherein each of the plurality of memory devices is associated with a subset of switching point cells in the associated output row and stores addresses identifying the subset of switching point cells.

7. The cross point switching system of claim 1, further comprising a biasing device for connection to said transconductance device by said enable circuit.

8. The cross point switching system of claim 7, wherein said biasing device includes a bias circuit associated with each output row.

9. The cross point switching system of claim 7, wherein said biasing device includes a bias circuit associated with each output switching point cell.

10. The cross point switching system of claim 1, wherein said enable circuit includes a cascode switch.

11. The cross point switching system of claim 10, wherein said enable circuit includes a bias cascode circuit coupled between said bias device and said transconductance device, and a gate switch for enabling said bias cascode circuit to deliver the output current of said bias device to said transconductance device.

12. The cross point switching system of claim 11, wherein said gate switch disables the bias cascode circuit associated with unidentified switching point cells.

13. The cross point switching system of claim 1, wherein said enable circuit actuates said output cascode device.

14. A cross point switching system comprising:
an array of switching point cells arranged in input rows and output rows;
each switching point cell including a transconductance device, an output cascode device, and an enable circuit;
each said output row having associated with it at least one bias device; and
a distinct memory device associated with each output row for identifying switching point cells in an associated output row and actuating the enable circuit of an identified switching point cell to deliver the output current of said bias device to the transconductance device of the identified switching point cell.

15. The cross point switching system of claim 14, wherein said enable circuit actuates said output cascode device.

16. The cross point switching system of claim 14, wherein said distinct memory device stores addresses identifying switching point cells in the associated output row.

17. The cross point switching system of claim 16, further comprising a decoder device responsive to said distinct memory device for actuating the enable circuit of the identified switching point cell to operate the transconductance device of the identified switching point cell.

18. The cross point switching system of claim 16, wherein said memory device includes a write enable input for latching said addresses.

19. The cross point switching system of claim 17, wherein said distinct decoder device disables each of the unaddressed switching point cells of the associated output row.

20. The cross point switching system of claim 16, wherein the at least one distinct memory device comprises are a plurality of memory devices arranged in different locations proximate to the associated output row, wherein each of the plurality of memory devices is associated with a subset of switching point cells in the associated output row and stores addresses identifying the subset of switching point cells.

21. The cross point switching system of claim 14, wherein said enable circuit includes a cascode switch for delivering the output current of said bias device to said transconductance device.

22. The cross point switching system of claim 21, wherein said enable circuit includes a bias cascode circuit coupled between said bias device and said transconductance device and a gate switch for enabling said bias cascode circuit to deliver the output current of said bias device to said transconductance device.

23. The cross point switching system of claim 22, wherein said gate switch disables the bias cascode circuit associated with each of the unidentified switching point cells.

24. A cross point switching system comprising:
an array of switching point cells arranged in input rows and output rows;
each switching point cell including a transconductance device, and an enable circuit cells;
an output bus;
a bias device; and
a distinct memory device associated with each output row for identifying switching point cells in an associated output row and actuating the enable circuit of an identified switching point cell to deliver the output current of the bias device to the transconductance device of the identified switching point cell;

each said output row having associated with it as least one output cascode device for interconnecting the transconductance device of the identified switching point cell to the output bus.

25. The cross point switching system of claim 24, wherein said enable circuit actuates said output cascode device.

26. The cross point switching system of claim 24, wherein said distinct memory device stores addresses identifying switching point cells in the associated output row.

27. The cross point switching system of claim 16, further comprising a decoder device responsive to said memory device for actuating the enable circuit of the identified switching point cell to operate the transconductance device of the identified switching point cell.

28. The cross point switching system of claim 26, wherein said memory device includes a write enable input for latching said addresses.

29. The cross point switching system of claim 27, wherein said distinct decoder device disables unaddressed switching point cells of the associated output row.

30. The cross point switching system of claim 26, wherein the at least one distinct memory device comprises a plurality of memory devices arranged in different locations proximate to the associated output row, wherein each of the plurality of memory devices is associated with a subset of switching point cells in the associated output row and stores addresses identifying the subset of switching point cells.

31. The cross point switching system of claim 24, wherein said enable circuit includes a cascode switch for delivering the output current of said bias device to said transconductance device.

32. The cross point switching system of claim 31, wherein said enable circuit includes a bias cascode circuit coupled between said bias device and said transconductance device and a gate switch for enabling said bias cascode circuit to deliver the output current of said bias device to said transconductance device.

33. The cross point switching system of claim 32, wherein said gate switch disables the bias cascode circuit associated with each of the unidentified switching point cells.

34. A cross point switching system comprising:
an array of switching point cells arranged in input rows and output rows;
each switching point cell including a transconductance device, and an enable circuit;
at least one bias device associated with each output row for providing a bias current to one or more switching point cells in an associated output row;
a memory device for identifying switching point cells in the associated output row and actuating the enable circuit of an identified switching point cell cell to deliver the output current of said bias device to at least one of a the transconductance device of the identified switching point cell;
a switching circuit for enabling a selected one of said at least one bias device associated with the identified switching point cell;
said bias device including a current mirror having an input reference portion responsive to a reference current and a co-located output local portion for reproducing a scaled current based on the reference current as the output current of the bias device.

35. The cross point switching system of claim 34, wherein said enable circuit actuates said output cascode device.

36. The cross point switching system of claim 34, wherein said memory device stores addresses identifying switching point cells in the associated output row.

37. The cross point switching system of claim 36, further comprising a decoder device responsive to said memory device for device for actuating the enable circuit of the identified switching point cell to operate the transconductance device of the identified switching point cell.

38. The cross point switching system of claim 36, wherein said memory device includes a write enable input for latching said addresses.

39. The cross point switching system of claim 37, wherein said distinct decoder device disables unaddressed switching point cells of the associated output row.

40. The cross point switching system of claim 36, further comprising a plurality of memory devices arranged in different locations proximate to the associated output row, wherein each of the plurality of memory devices is associated with a subset of switching point cells in the associated output row and stores addresses identifying the subset of switching point cells.

41. The cross point switching system of claim 34, wherein said enable circuit includes a cascode switch for delivering the output current of said bias device to said transconductance device.

42. The cross point switching system of claim 41, wherein said enable circuit includes a bias cascode circuit coupled between said bias device and said transconductance device and a gate switch for enabling said bias cascode circuit to deliver the output current of said bias device to said transconductance device.

43. The cross point switching system of claim 42, wherein said gate switch disables the bias cascode circuit associated with each of the unidentified switching point cells.

44. The cross point switching system of claim 34, wherein there are a plurality of said current mirrors each associated with a subset of switching point cells in the associated output row and each co-located with its associated subset.

45. The cross point switching system of claim 34, wherein said bias device includes a reference current source.

46. A cross point switching system comprising:
an array of switching point cells arranged in input rows and output rows;
an output bus;
each switching point cell including a transconductance device and an enable circuit;
each said output row having associated with it at least one bias device, at least one output cascode device, at least one distinct memory device for storing an address identifying a switching point cell in its associated output row and a decoder device responsive to said memory device for activating the enable circuit of an identified switching point cell to:
activate the output cascode device associated with the identified switching point cell to electrically couple the transconductance device to the output bus, and
deliver the output current of the bias device to the transconductance device.

47. The cross point switching system of claim 46, wherein there is a bias device, and an output cascode device associated with each subset of switching point cells in the associated output row.

48. The cross point switching system of claim 46, wherein said bias device includes a current mirror having a reference portion responsive to a reference current and a co-located local output portion for reproducing that current as the bias device output current.

49. The cross point switching system of claim 48, wherein there are a plurality of said current mirrors each associated with a subset of switching point cells in the associated output row and each co-located with its associated subset.

50. A switching network comprising:
- a plurality of biasable circuits;
- a selection circuit for selecting one of said biasable circuits;
- a bias device for providing a bias current to the selected biasable circuits said bias device including a current mirror having an input reference portion responsive to a reference current and a co-located output local portion for reproducing that current as the bias current for at least one of the plurality of biasable circuits.

51. The cross point switching system of claim 1, wherein each of the at least one distinct memory device and the distinct decoder are located in the associated output row.

52. The cross point switching system of claim 34, wherein the output current of the bias device is delivered to at least one of a collector and emitter of the transconductance device.

* * * * *

UNITED STATES PATENT AND TRADEMARK OFFICE
CERTIFICATE OF CORRECTION

PATENT NO. : 8,289,127 B2  Page 1 of 1
APPLICATION NO. : 11/711250
DATED : October 16, 2012
INVENTOR(S) : Bankman et al.

It is certified that error appears in the above-identified patent and that said Letters Patent is hereby corrected as shown below:

In the Specification

In column 1 at line 50, change "system" to --system.--.

In column 3 at line 44-45, change "as least" to --at least--.

In column 5 at line 21, change "and;" to --; and--.

In column 7 at line 58, change "102" to --102,--.

In column 7 at line 64-65, change "disabled" to --disabled.--.

In column 8 at line 14 (approx.), change "disable it" to --disable it, it--.

In the Claims

In column 9 at line 36, In Claim 3, change "disables the" to --disables--.

In column 9 at line 43, In Claim 5, change "each said" to --each--.

In column 10 at line 36, In Claim 19, change "disables each of the" to --disables--.

In column 10 at line 39, In Claim 20, change "are a" to --a--.

In column 10 at line 62, In Claim 24, change "circuit cells;" to --circuit;--.

In column 11 at line 4, In Claim 24, change "as least" to --at least--.

In column 11 at line 54, In Claim 34, change "cell cell" to --cell--.

In column 11 at line 55-56, In Claim 34, change "a the" to --the--.

In column 12 at line 6, In Claim 37, change "device for device" to --device--.

Signed and Sealed this
Twenty-third Day of April, 2013

Teresa Stanek Rea
*Acting Director of the United States Patent and Trademark Office*